United States Patent
Reed et al.

(10) Patent No.: US 10,725,640 B1
(45) Date of Patent: *Jul. 28, 2020

(54) MACRO/MICRO CONTROL USER INTERFACE ELEMENT

(71) Applicant: ALLSCRIPTS SOFTWARE, LLC, Chicago, IL (US)

(72) Inventors: Christy Jill Reed, Raleigh, NC (US); Anthony Stuart, Wake Forest, NC (US); Art Swanson, Cary, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 603 days.

This patent is subject to a terminal disclaimer.

(21) Appl. No.: 15/395,796

(22) Filed: Dec. 30, 2016

Related U.S. Application Data

(63) Continuation of application No. 13/831,666, filed on Mar. 15, 2013, now Pat. No. 9,594,492, which is a continuation of application No. 13/732,085, filed on Dec. 31, 2012, now abandoned.

(60) Provisional application No. 61/692,687, filed on Aug. 23, 2012.

(51) Int. Cl.
*G06F 3/0484* (2013.01)
*G06F 3/0488* (2013.01)

(52) U.S. Cl.
CPC ...... *G06F 3/04847* (2013.01); *G06F 3/04883* (2013.01)

(58) Field of Classification Search
CPC .................. G06F 3/04847; G06F 3/04883
See application file for complete search history.

(56) References Cited

U.S. PATENT DOCUMENTS

| | | | |
|---|---|---|---|
| 7,080,324 B1 * | 7/2006 | Nelson | G06F 3/04847 715/771 |
| 7,117,450 B1 * | 10/2006 | Chaudhri | G06F 3/04847 715/787 |
| 2008/0024682 A1 * | 1/2008 | Chen | H04N 5/4403 348/734 |
| 2008/0309632 A1 * | 12/2008 | Westerman | G06F 3/038 345/173 |
| 2009/0228825 A1 * | 9/2009 | Van Os | G06F 3/0488 715/780 |
| 2011/0082627 A1 * | 4/2011 | Small | B60K 35/00 701/48 |
| 2011/0167369 A1 * | 7/2011 | van Os | G06F 3/0483 715/769 |
| 2012/0036480 A1 * | 2/2012 | Warner | G06F 3/04847 715/833 |

* cited by examiner

*Primary Examiner* — Matthew Ell
*Assistant Examiner* — Maria S Ayad
(74) *Attorney, Agent, or Firm* — Loza & Loza, LLP; Peter Zura

(57) ABSTRACT

A user interface element includes a display area configured to display a value, an increment button configured to increment the displayed value, a decrement button configured to decrement the displayed value, and a slider configured to allow a user to rapidly increase or decrease the displayed value by sliding a finger across the slider.

19 Claims, 23 Drawing Sheets

*Prior Art*

MACRO/MICRO CONTROL USER INTERFACE ELEMENT

CROSS-REFERENCE TO RELATED APPLICATIONS

The present application is a U.S. continuation patent application of, and claims priority under 35 U.S.C. § 120 to, U.S. nonprovisional patent application Ser. No. 13/831,666, filed Mar. 15, 2013, incorporated herein by reference, which '666 application is a U.S. continuation patent application of, and claims priority under 35 U.S.C. § 120 to, U.S. nonprovisional patent application Ser. No. 13/732,085, filed Dec. 31, 2012, which '085 application and any patent application publication thereof are incorporated by reference herein, and which '085 application is a U.S. nonprovisional patent application of, and claims priority under 35 U.S.C. § 119(e) to, U.S. provisional patent application 61/692,687, filed Aug. 23, 2012, which provisional patent application is incorporated by reference herein, and which '666 application is a U.S. nonprovisional patent application of, and claims priority under 35 U.S.C. § 119(e) to, U.S. provisional patent application 61/692,687, filed Aug. 23, 2012. The present application further incorporates herein by reference the entire disclosure of Exhibit 1 submitted herewith as an appendix hereto.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to user interface elements and methodologies for receiving user input.

There are a large number of known methodologies for allowing a user to enter data via a graphical user interface. Some of these methodologies allow for direct data entry into a text box or other data entry box. Such direct data entry may be accomplished via a physical keyboard, virtual keyboard presented on a touchscreen, or via voice entry. Other methodologies allow for user input via adjustment of one or more presented sliders. FIG. 1 illustrates an exemplary such user interface which includes three such sliders.

Across similar situations within a single software application, or across the same scenarios in related applications, the use of consistent user interface components is often beneficial. That said, applications that have different input requirements (keyboard, touch, speech, etc) or situations within an application with slightly different requirements or variable types will often force a designer or developer to use inconsistent user interface controls. Comparatively, increasing the consistency of controls could be beneficial for a variety of reasons, including; limiting the learning curve for end users across disparate tasks or products, building brand recognition and equity, increasing time to value for new software installations, and decreasing overall task or workflow completion times.

A need exists for improvement in user interface elements and methodologies for receiving user input. These, and other needs, are addressed by one or more aspects of the present invention.

SUMMARY OF THE INVENTION

The present invention includes many aspects and features. Moreover, while many aspects and features relate to, and are described in, the context of healthcare, the present invention is not limited to use only in this context, as will become apparent from the following summaries and detailed descriptions of aspects, features, and one or more embodiments of the present invention.

Accordingly, one aspect of the present invention relates to a method of receiving user input which includes displaying via a touchscreen display a user interface element comprising a display area configured to display a value, an increment button configured to increment the displayed value, a decrement button configured to decrement the displayed value, and a slider configured to allow a user to rapidly increase or decrease the displayed value by sliding a finger across the slider. The method further includes receiving, via the touchscreen display, input from a user; electronically determining that the user input corresponds to desired user entry using the user interface element; and modifying the displayed value based on the received input from the user.

In a feature of this aspect, the slider is configured such that sliding a finger across the slider more rapidly results in a more rapid rate of change of the displayed value.

In a feature of this aspect, the user interface element is configured such that engaging the increment button and sliding a finger across the slider in a first direction results in a lower rate of change than would otherwise occur if a finger was slid across the slider in the same manner at the same speed without engaging the increment button.

In a feature of this aspect, the user interface element is configured such that engaging the decrement button and sliding a finger across the slider in a second direction results in a greater rate of change than would otherwise occur if a finger was slid across the slider in the same manner at the same speed without engaging the decrement button.

In a feature of this aspect, the user interface element is configured such that engaging the decrement button and sliding a finger across the slider in a first direction results in a lower rate of change than would otherwise occur if a finger was slid across the slider in the same manner at the same speed without engaging the decrement button.

In a feature of this aspect, the user interface element is configured such that engaging the increment button and sliding a finger across the slider in a second direction results in a greater rate of change than would otherwise occur if a finger was slid across the slider in the same manner at the same speed without engaging the increment button.

In a feature of this aspect, the display area is configured to allow a user to directly input a value. In at least some implementations, the method further includes displaying a virtual keyboard for user input of a value.

In a feature of this aspect, the method further includes displaying the user interface element together with additional user interface elements.

In at least some implementations, the additional user interface elements include one or more radio buttons, one or more dropdown boxes, or one or more text boxes.

In a feature of this aspect, the slider includes a label.

In a feature of this aspect, the user interface element is configured such that engaging the increment button for a certain period of time effects repeated incrementing of the displayed value.

In a feature of this aspect, the user interface element is configured such that engaging the decrement button for a certain period of time effects repeated decrementing of the displayed value.

Another aspect relates to an electronic device comprising a touchscreen and software loaded thereon configured to perform a disclosed method. In various implementations, the electronic device might be, for example, an iPad, a tablet computer, a slate computer, an iPhone, a smartphone, a phone, a desktop computer, or an all-in-one computer.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
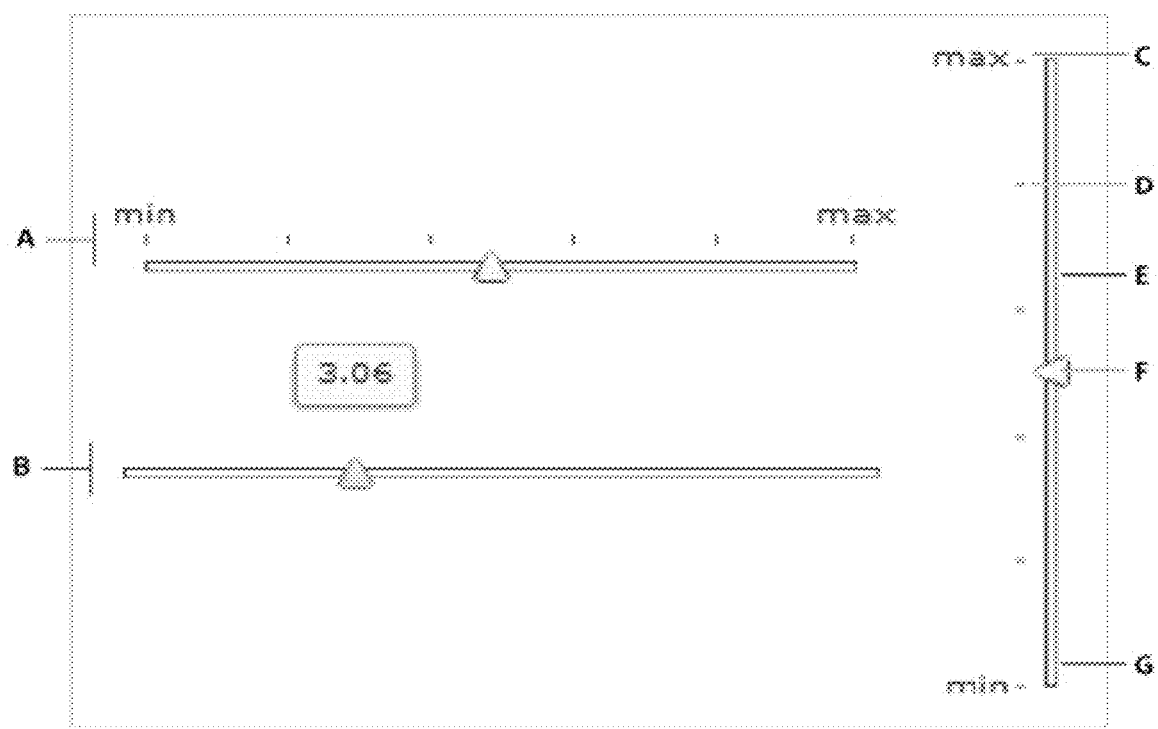
FIG. 1 illustrates an exemplary prior art user interface which includes three sliders.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 2A:
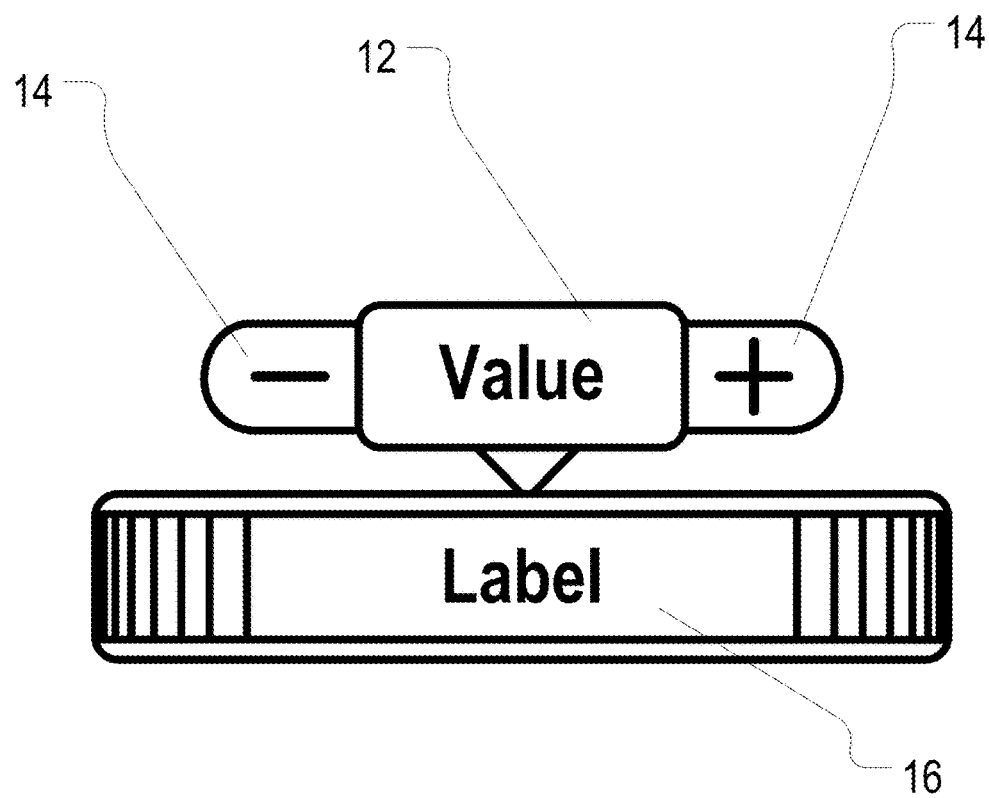
FIG. 2A illustrates a user interface element configured for use in a software application designed for use with a touchscreen display in accordance with a preferred embodiment of the present invention.

Turning now to the figures, FIG. 2A illustrates a user interface element 10 configured for use in a software application designed for use with a touchscreen display in accordance with a preferred embodiment of the present invention. The user interface element 10 of FIG. 2A includes a value display area 12, increment and decrement buttons 14, and a slider 16. The slider 16 includes a label indicating what particular data the value in the value display area 12 represents.

Figure 2B:
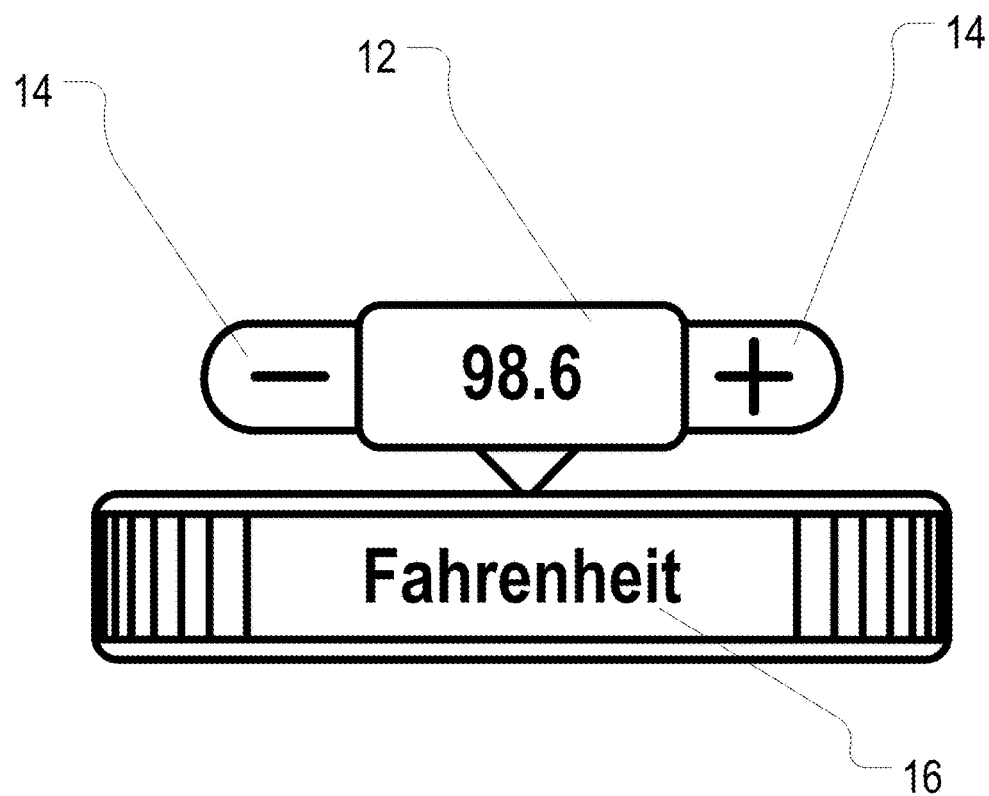
FIG. 2B illustrates an exemplary user interface element for a temperature value.

For example, FIG. 2B illustrates an exemplary user interface element 10 for a temperature value. Such an exemplary user interface element 10 is preferably utilized by a nurse or other healthcare worker after measuring a patient's temperature to enter the ascertained temperature data.

In one or more preferred implementations, such a user interface element 10 is configured to start with a blank value, while in at least some other implementations such a user interface element 10 is configured to start with a preconfigured value, such as, for example, "98.6" degrees Fahrenheit. In at least some preferred implementations, a user interface element 10 is configured to start with a value corresponding to a last reading or input associated with the particular data the user interface element 10 allows entry of (such as a last temperature reading for a patient that might have been entered via a software application a user interface element 10 is a part of, and/or which might be loaded from a database).

Figure 3:
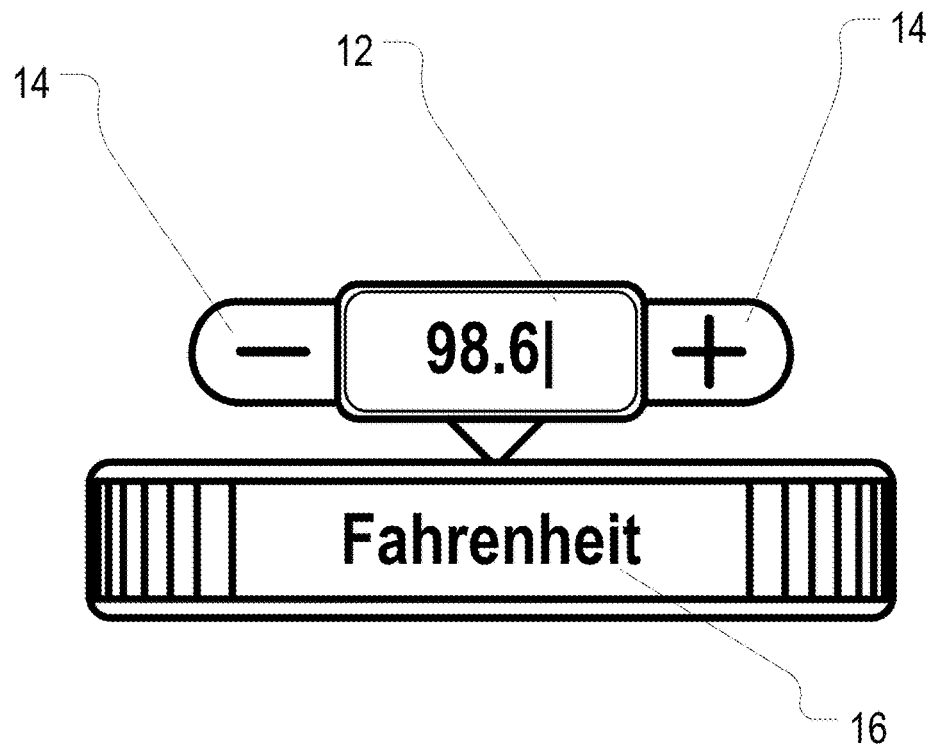
FIG. 3 illustrates use of a virtual keyboard for direct entry of a value.
Figure 3:
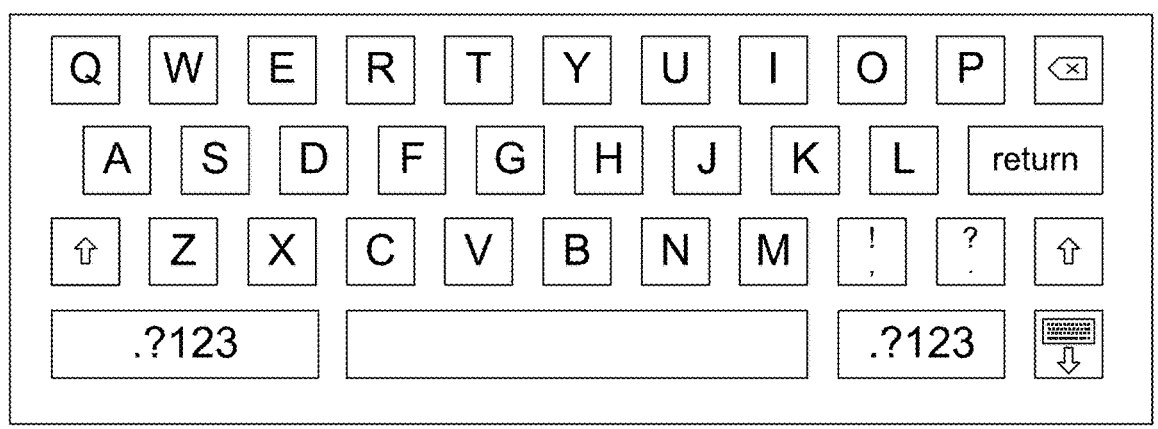

The value display area 12 is preferably configured such that a user can engage it (e.g., touch the portion of the screen on which it is displayed with his or her finger) in order to bring up a cursor and an interface which allows for direct entry of a value, as illustrated in FIG. 3 (although it will be appreciated that the virtual keyboard interface element and user interface element 10 may be larger or smaller relative to each other, and in some preferred implementations user interface element 10 would be smaller relative to the virtual keyboard, although it is illustrated here as being rather large relatively for purposes of clarity). In one or more preferred implementations, such direct entry may be accomplished using such a virtual keyboard, using physical input devices such as a keyboard and/or mouse, and/or using voice entry.

Figure 4:
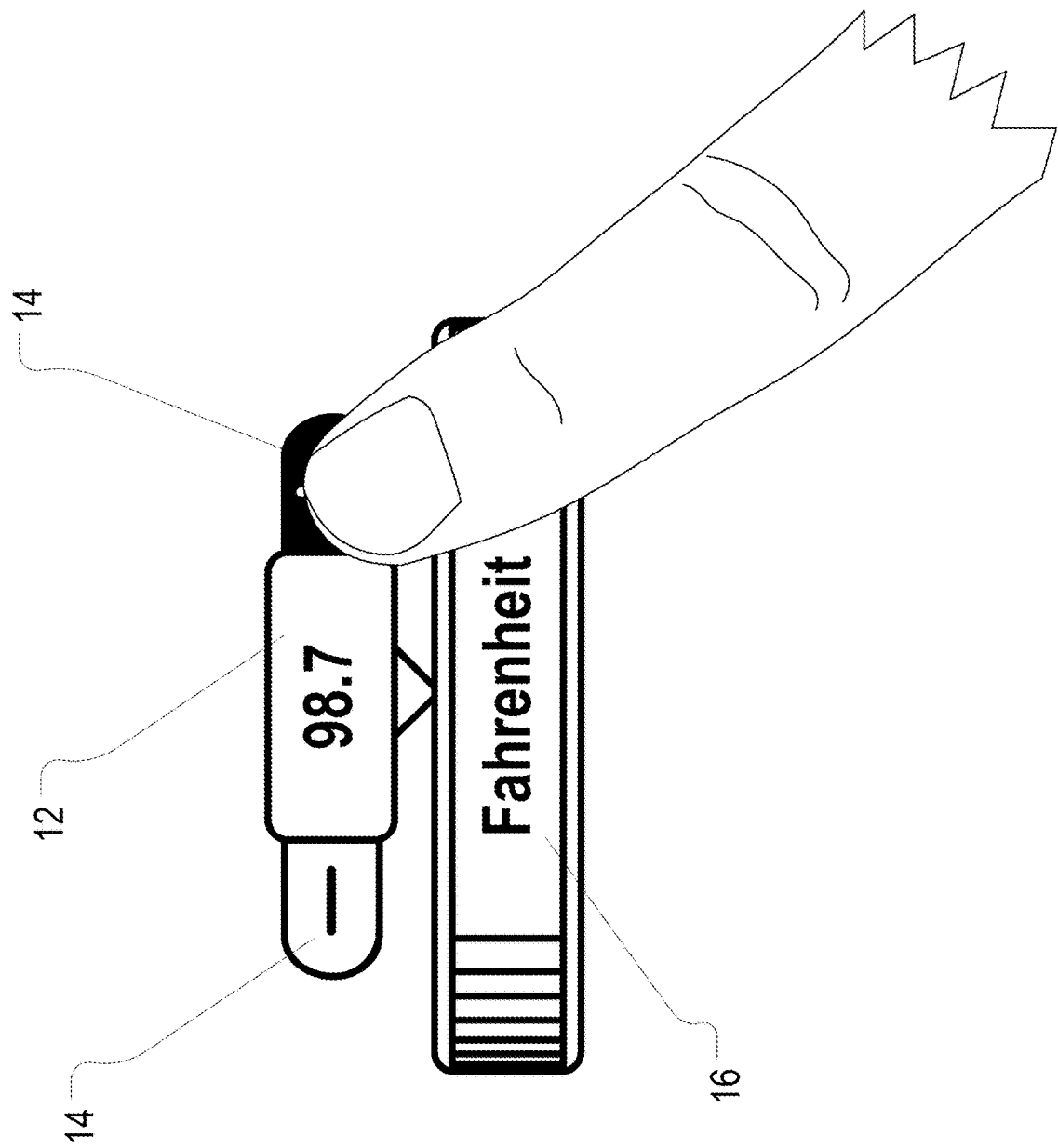
FIG. 4 illustrates use of the increment button.

The increment and decrement buttons 14 allow a user to slowly increment or decrement the value displayed in the value display area 12. For example, a user can engage the increment button 14 to increment the displayed value "98.6" in FIG. 2B such that the value is incremented to "98.7", as illustrated in FIG. 4. Because these increment and decrement buttons 14 allow for easy entry of small changes to the displayed value, they can be characterized as facilitating micro level changes of the value. Additionally, however, in at least some preferred implementations, continually engaging one of these buttons 14 (e.g. holding ones' finger over the button for a prolonged period of time) effects more rapid change of the displayed value.

In contrast to the increment and decrement buttons 14, the slider 16 preferably is configured to easily allow for larger changes to the displayed value. Specifically, a user can more rapidly increase or decrease the displayed value by sliding a finger across the slider 16. In preferred implementations, a user can rapidly increase a displayed value by sliding their finger from left to right across a slider (or, in some implementations, from a bottom of a slider to a top), or rapidly decrease a displayed value by sliding their finger from right to left across a slider (or, in some implementations, from a top of a slider to a bottom).

Figure 5A:
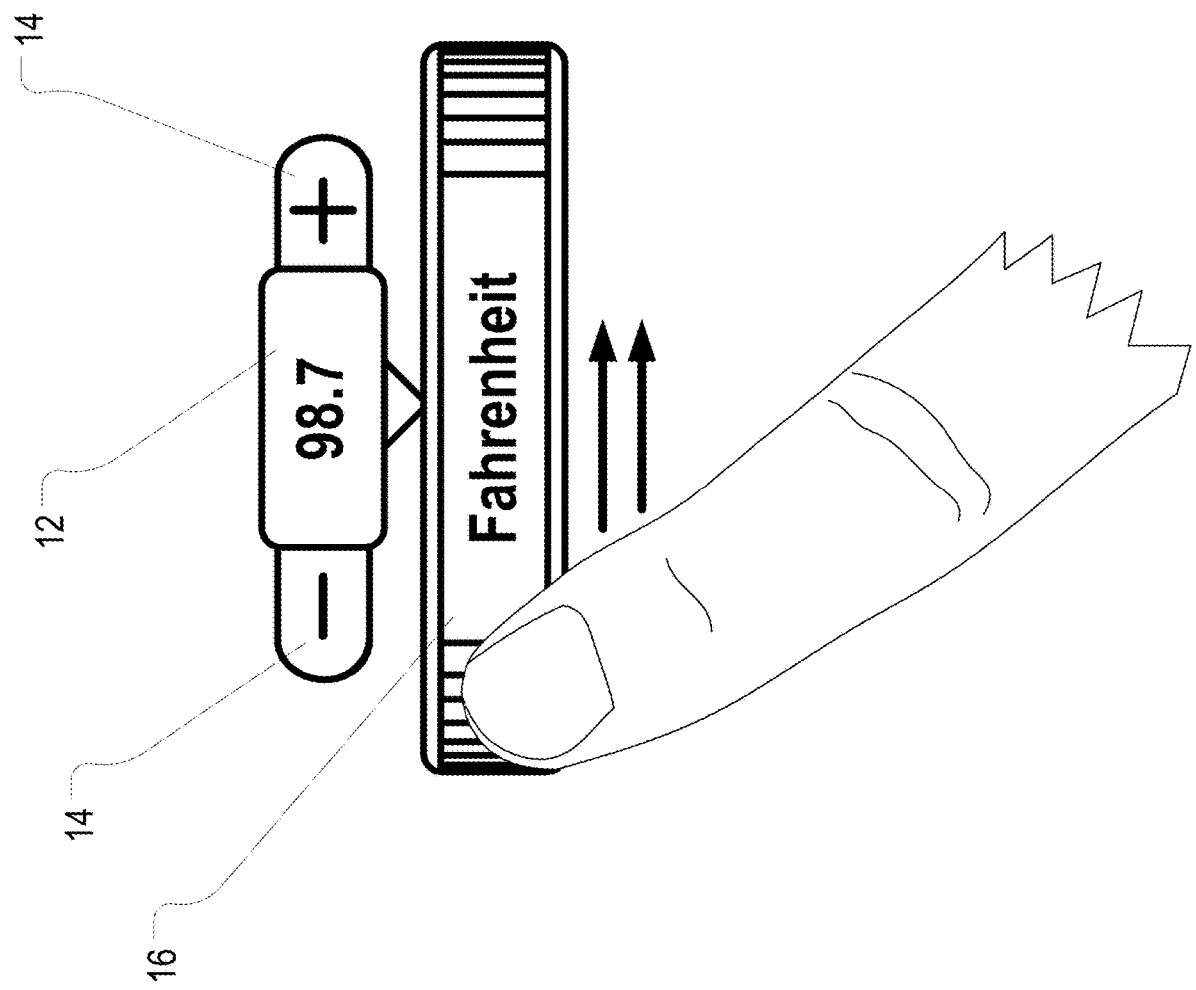
FIGS. 5A-5J illustrate the increase of a displayed temperature value in response to a user sliding his or her finger across a slider.
Figure 5B:
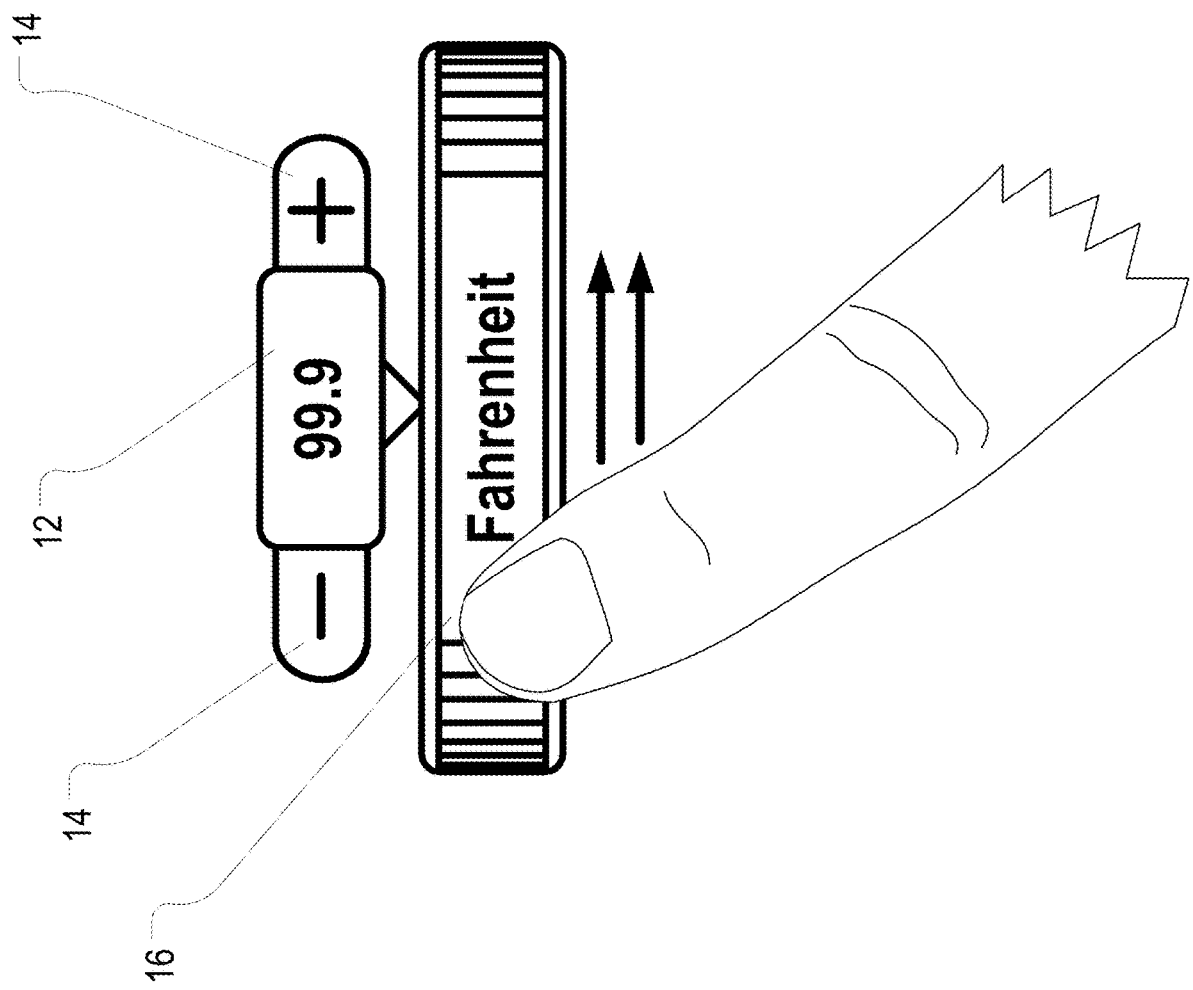
Figure 5C:
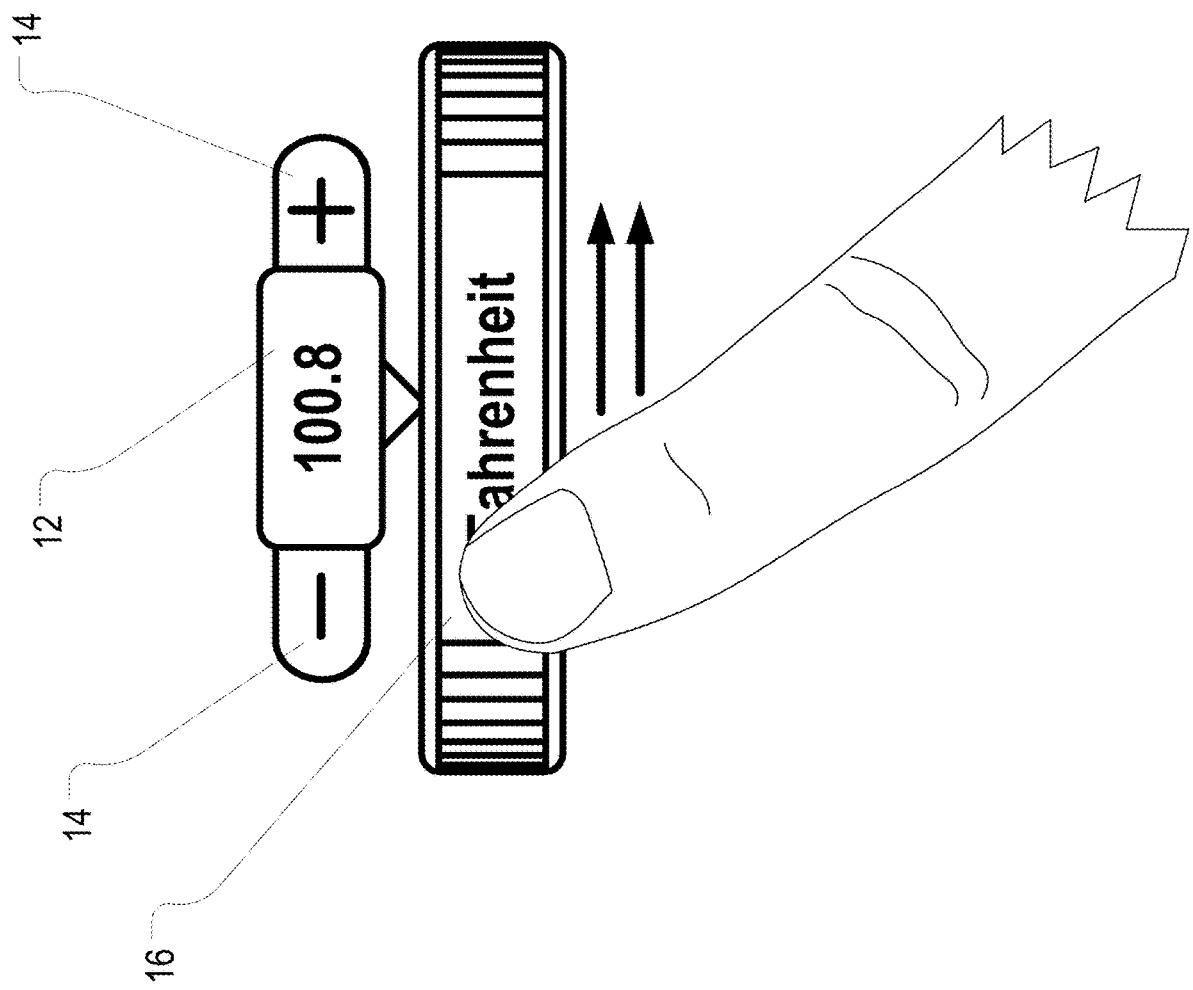
Figure 5D:
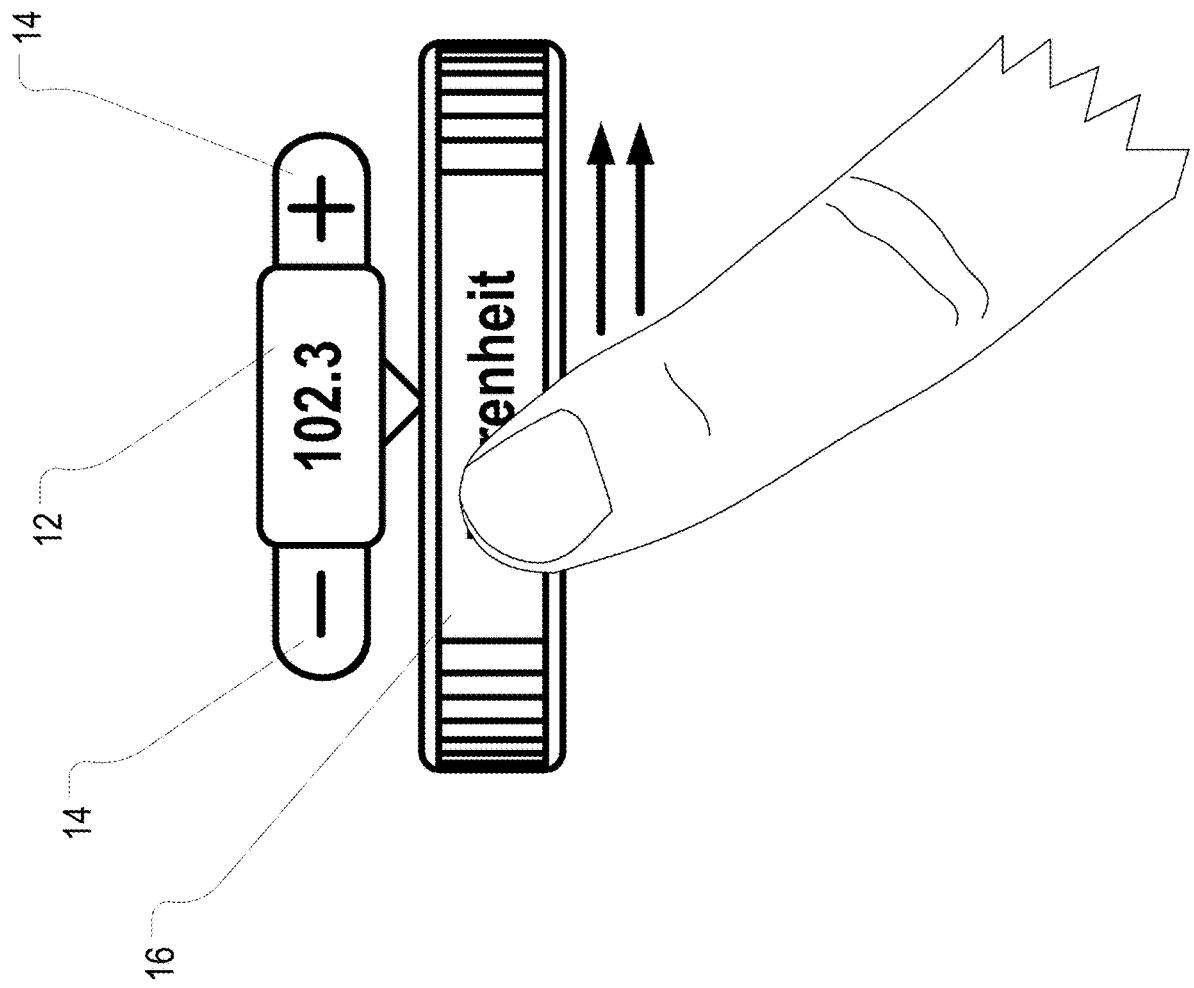
Figure 5E:
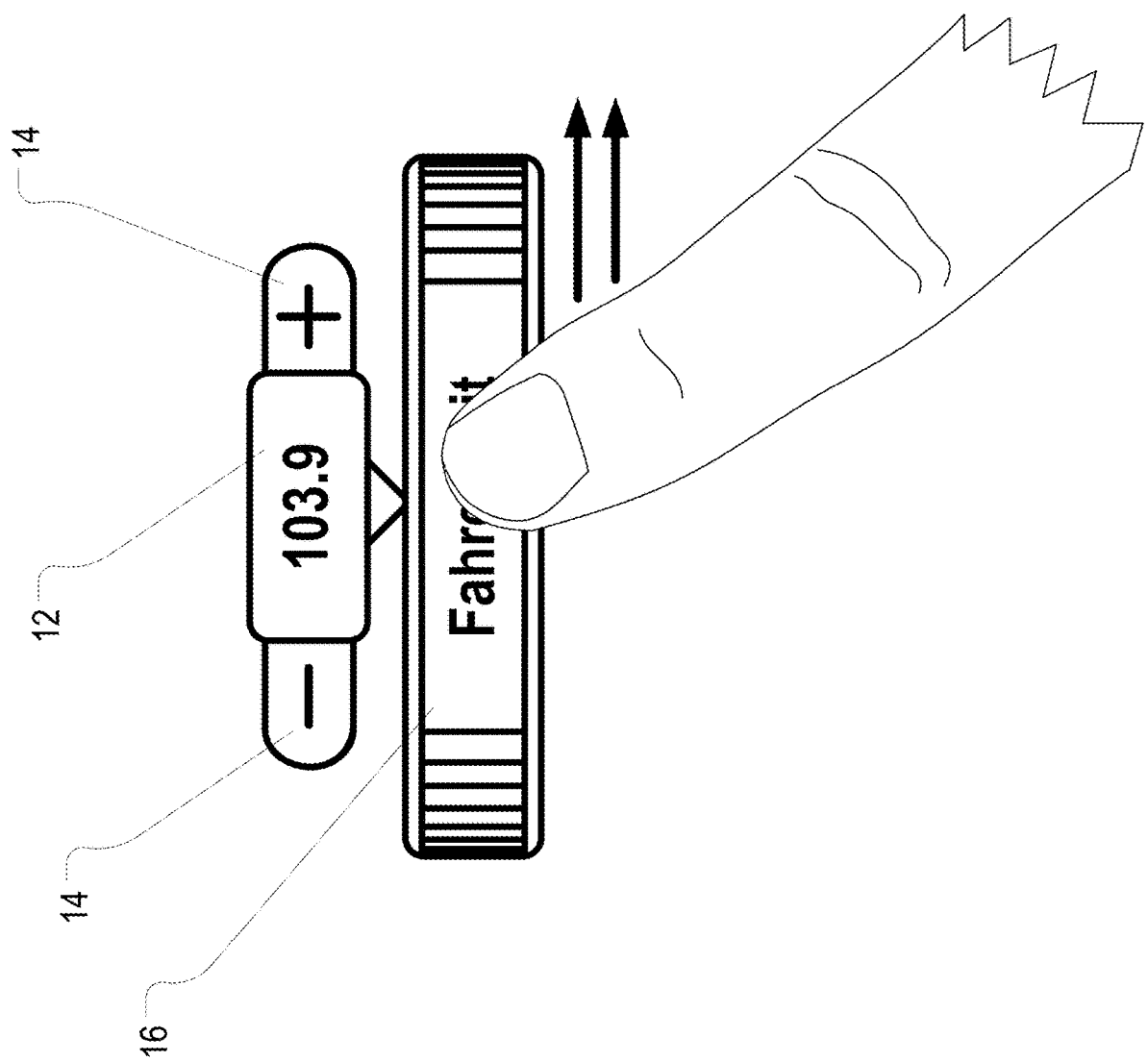
Figure 5F:
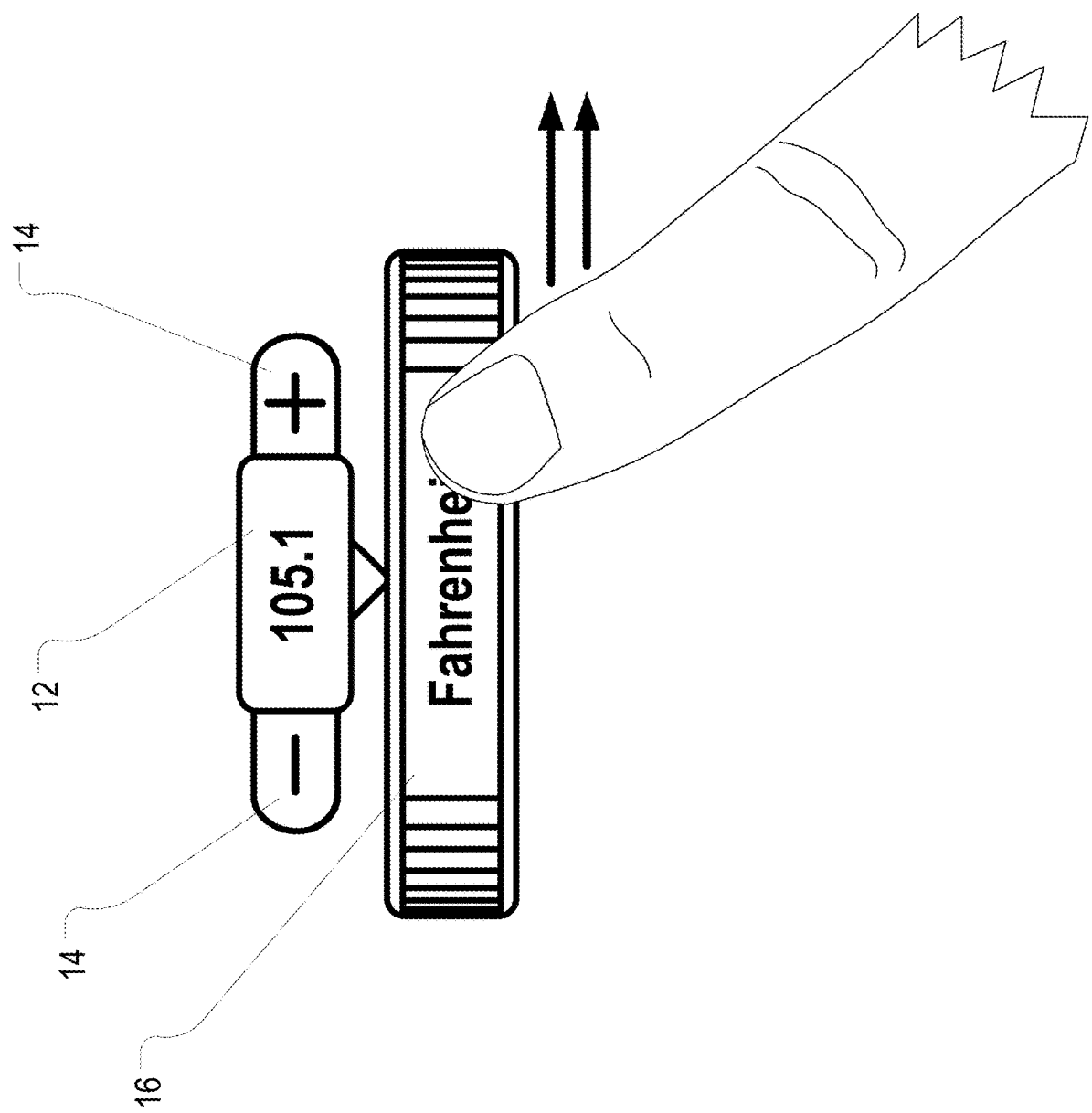
Figure 5G:
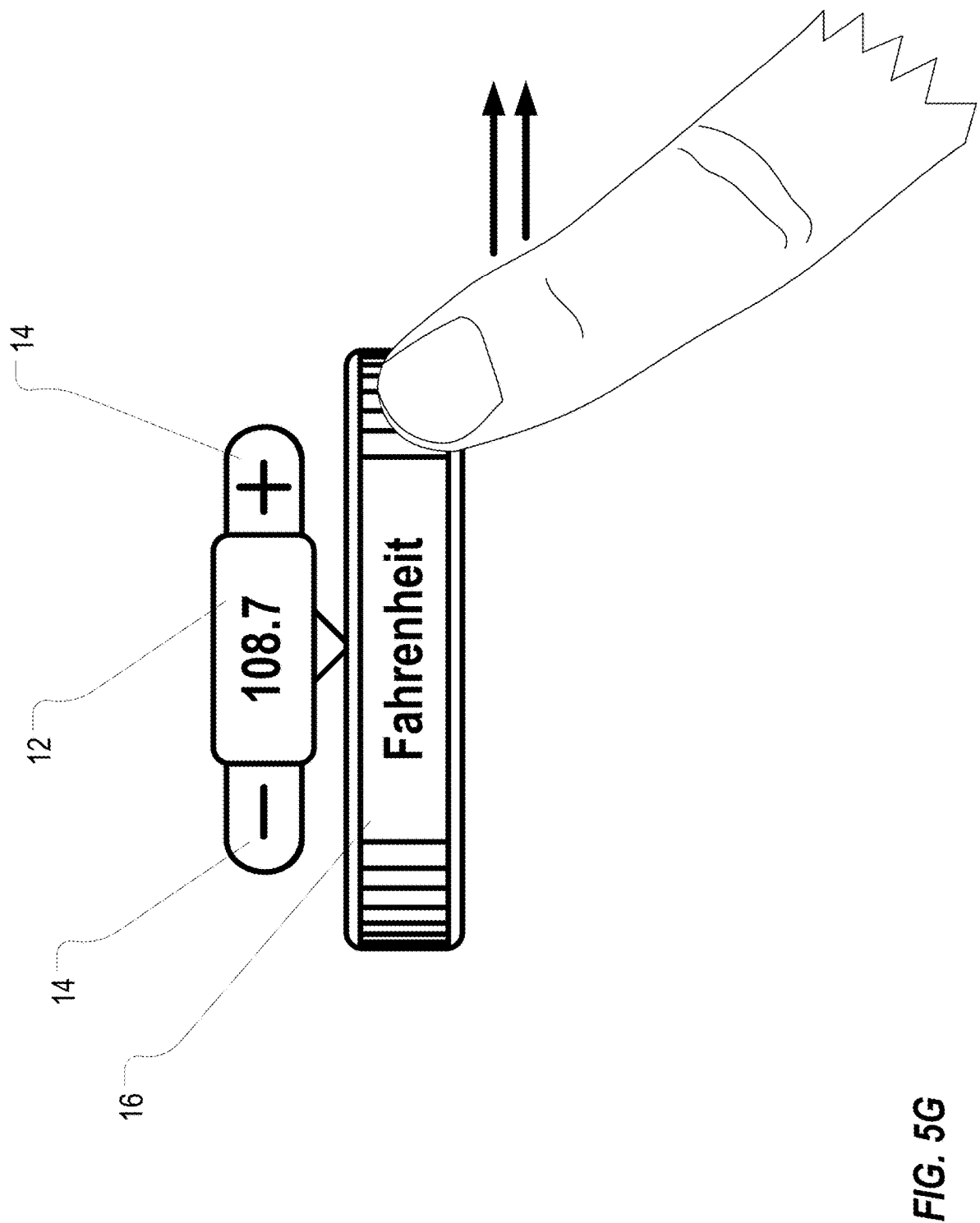
Figure 5H:
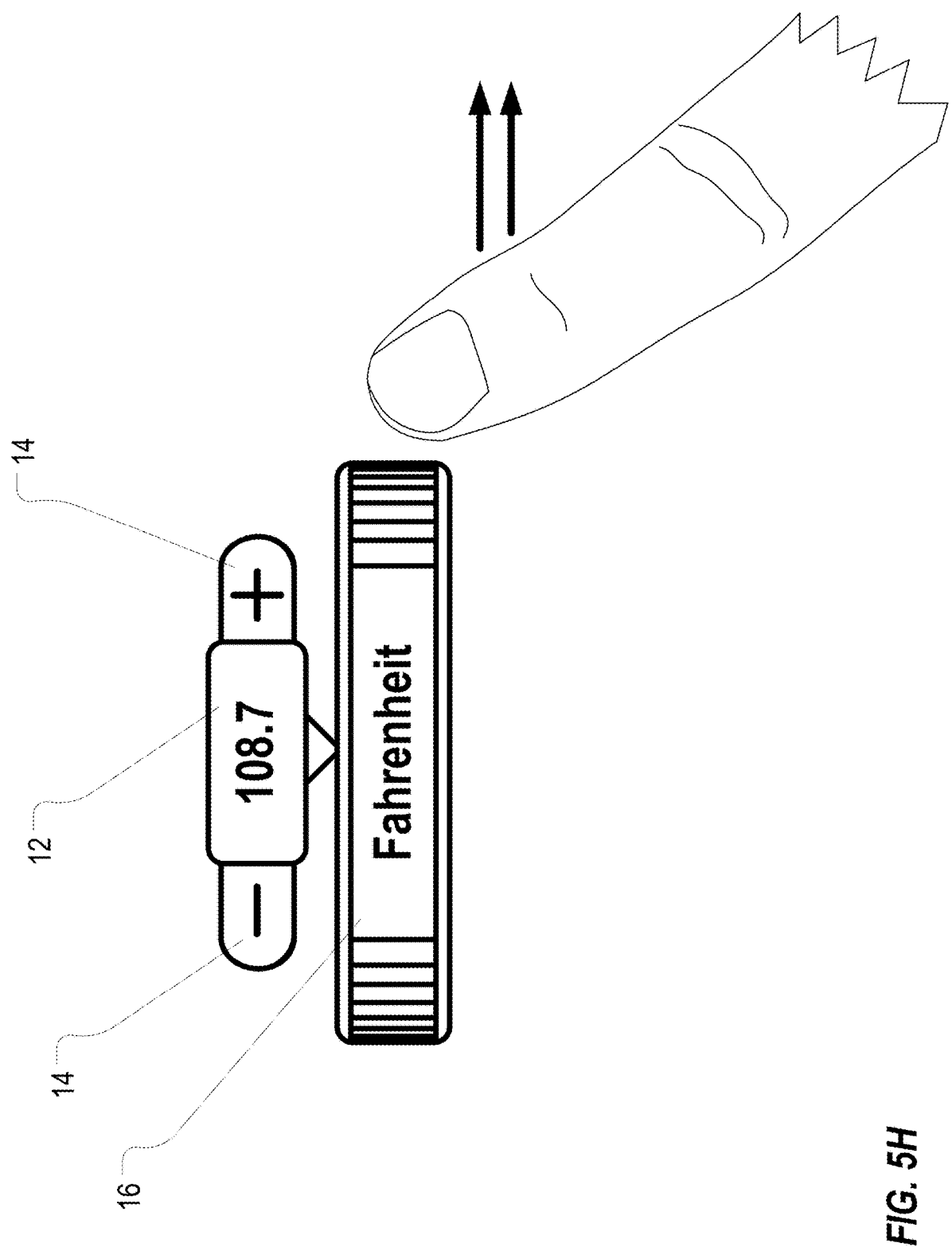
Figure 5I:
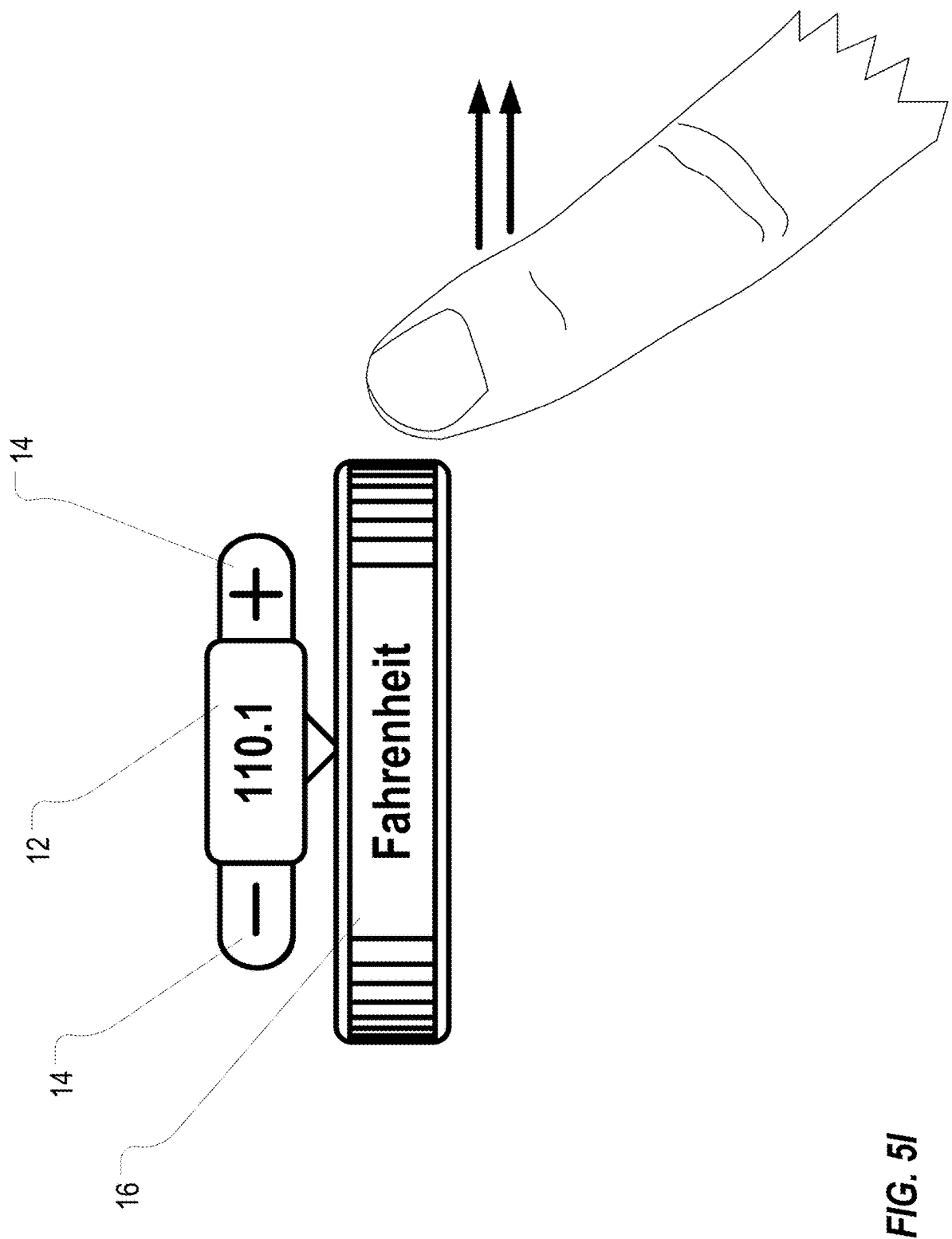
Figure 5J:
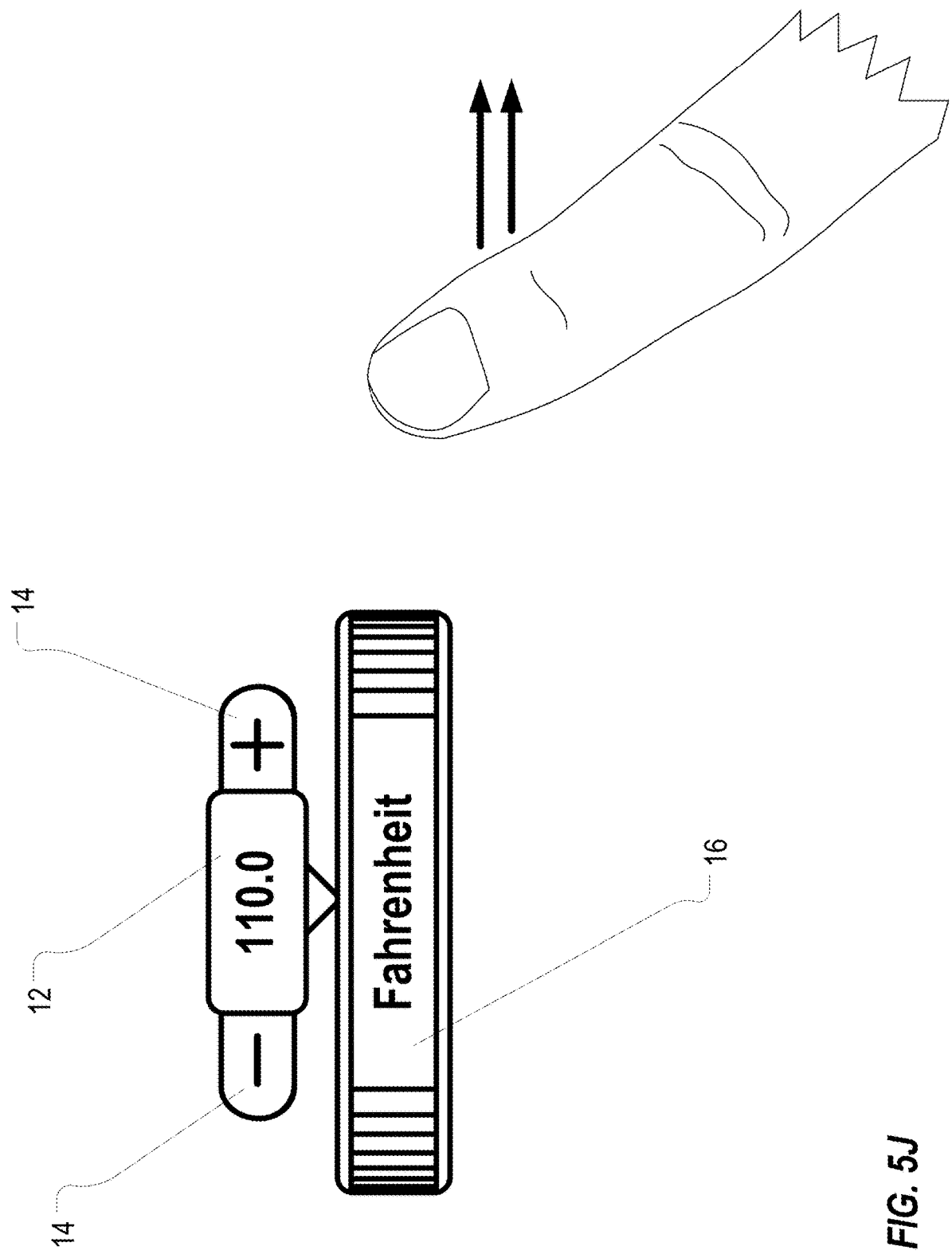
Figure 6A:
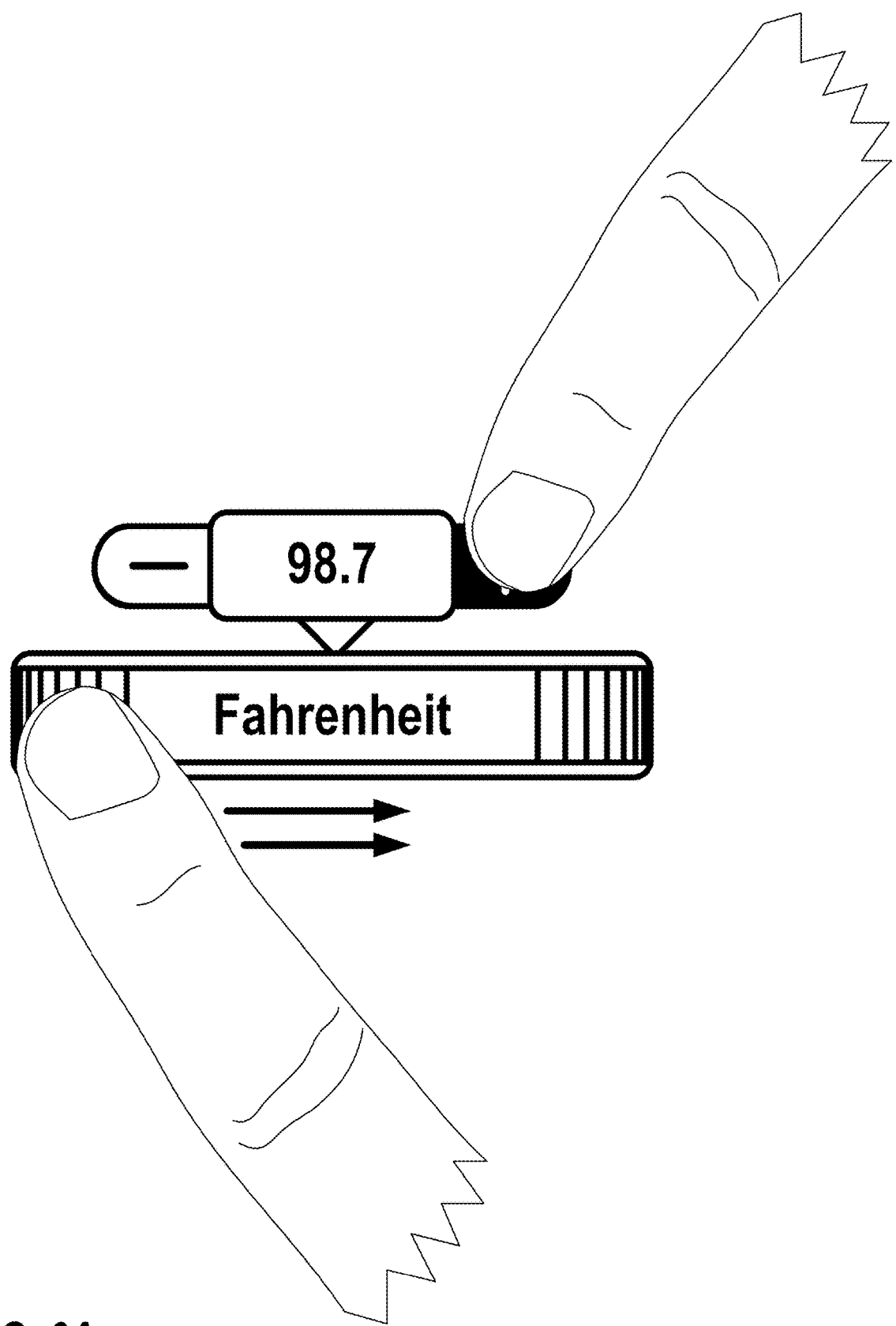
FIGS. 6A-6D illustrates the concurrent use of both an increment button and a slider.
Figure 6B:
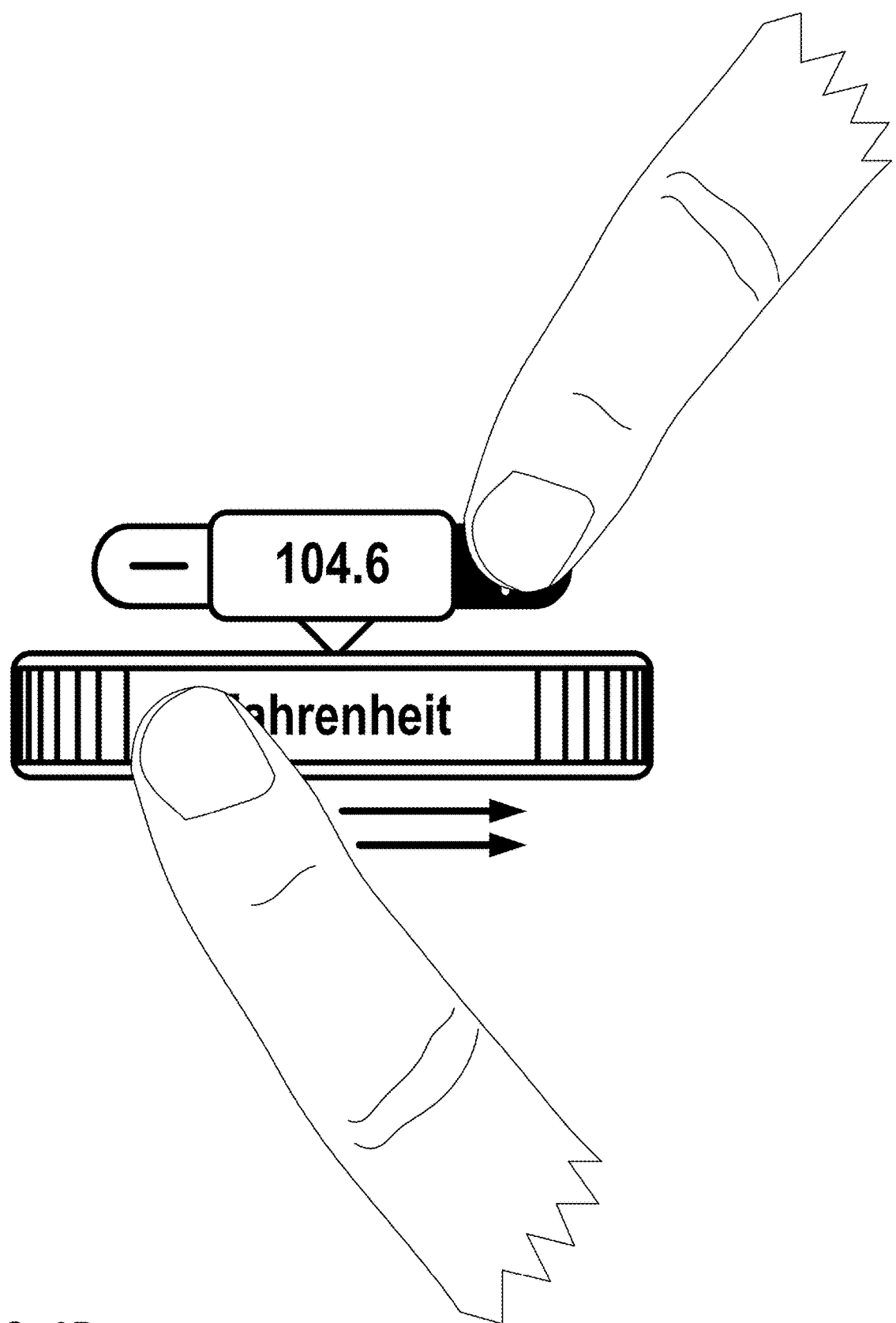
Figure 6C:
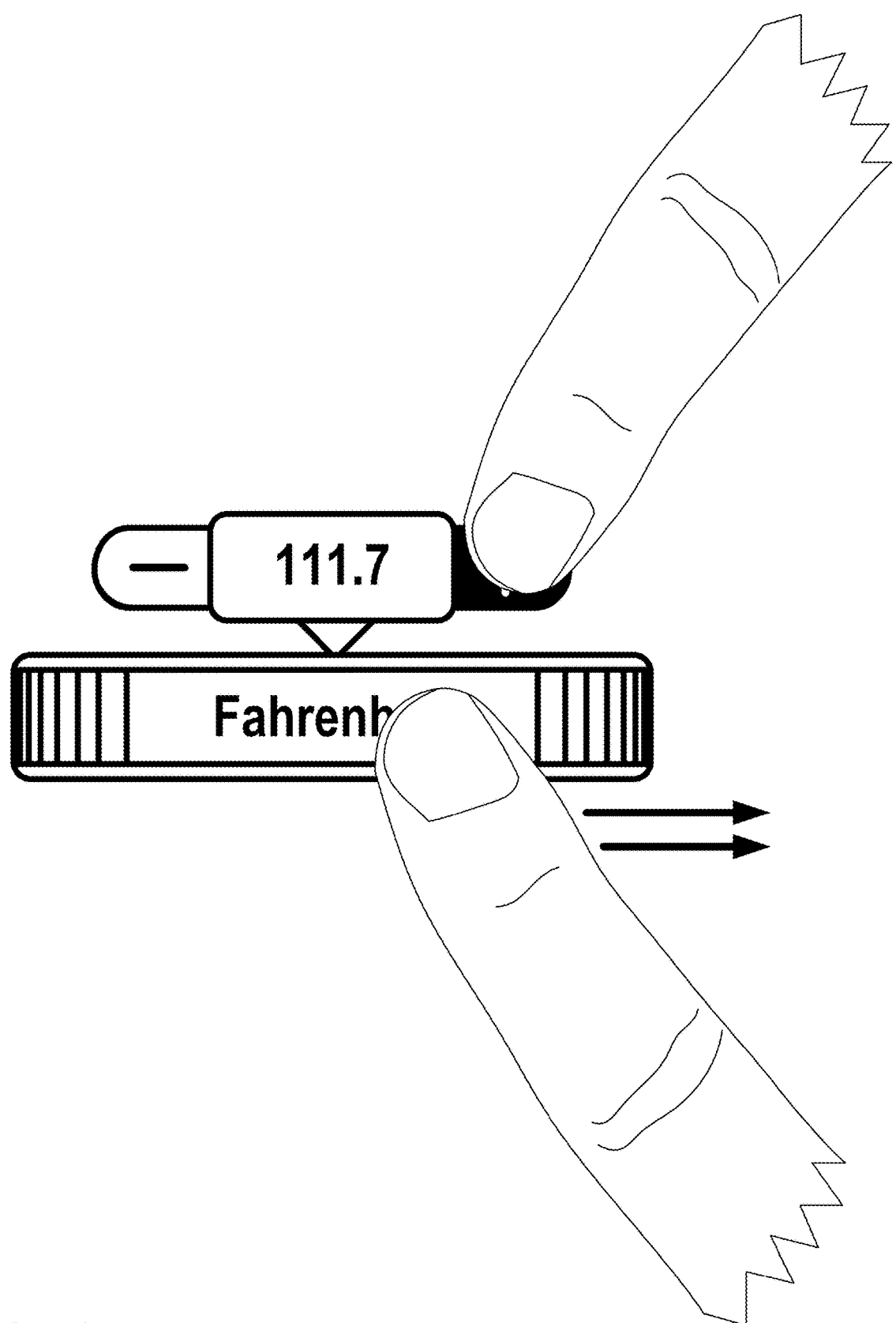
Figure 6D:
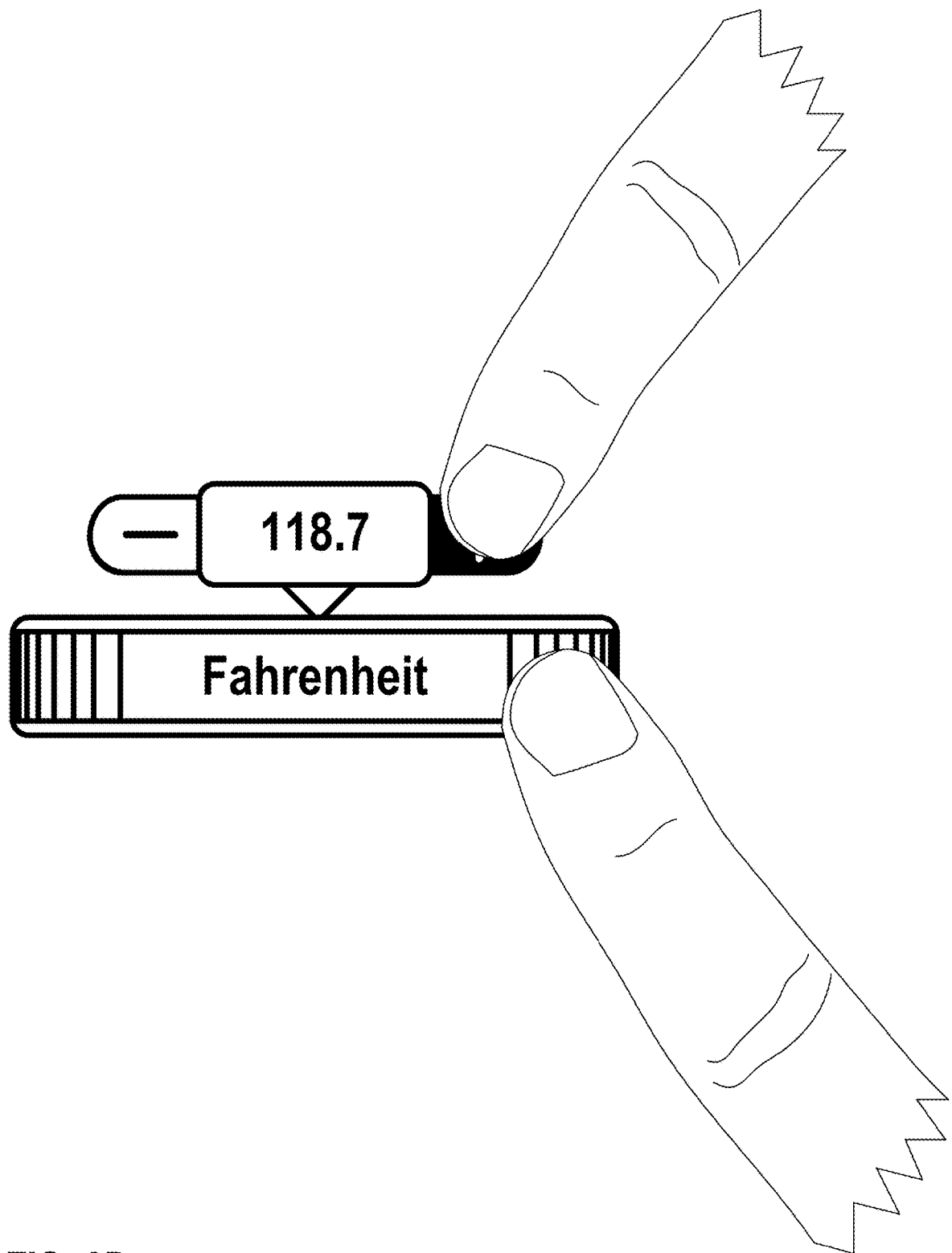

FIGS. 5A-5G illustrate the rapid increase of a displayed temperature value in response to a user sliding his or her finger across the slider 16. In some preferred implementations, once a user reaches the end of the slider 16, continuing to slide his or her finger will no longer increase the displayed value, as illustrated via reference to FIGS. 5G and 5H, while in at least some other preferred implementations, continuing to slide his or her finger will continue to increase the displayed value, as illustrated via reference to FIGS. 5G and 5I. In either event, in some preferred implementations, a user can still increase the displayed value further by once again placing his figure on the slider 16 (e.g. near a left side of the slider 16) and sliding his or her finger to the right again. For example, it may be that sliding a finger across the slider 16 from left to right once will only increase a displayed value by ten, but a user could then slide his or her finger across additional times to increase the displayed value further. In at least some preferred implementations, however, a user interface element 10 has a preconfigured maximum value and/or a preconfigured minimum value, which cannot be exceeded no matter how many times a user slides his or her finger across the slider 16. For example, returning to the situation illustrated in FIG. 5I, if the user interface element 10 had a preconfigured maximum value of "110.0", then the displayed value would cap out at that value, as illustrated in FIG. 5J, regardless of how far the user slides his or her finger.

In some preferred implementations, a slider 16 is configured for sliding to effect change of the displayed value at a predetermined rate selected based on consideration of the type of the value and the likely changes that will need to be effected using the user interface element. For example, a user interface element 10 configured for entry of temperature in Celsius might have a slider 16 configured for smaller increases or decreases based on the same range of motion across a slider 16 than a user interface element configured for entry of temperature in Fahrenheit. In at least some preferred implementations, the rate of change of the displayed value when a user slides his or her finger across the slider 16 can vary based on the speed at which the user slides his or her finger. For example, in some preferred implementations, a user can increase the speed at which the displayed value is increased or decreased by increasing the speed at which he or she slides his or her finger across the slider 16, or decrease the speed at which the displayed value is increased or decreased by decreasing the speed at which he or she slides his or her finger across the slider 16.

In at least some preferred implementations utilizing a maximum or minimum value, the rate of change of the displayed value when a user slides his or her finger across the slider 16 slows down as the displayed value approaches such maximum or minimum value.

In one or more implementations, the slider 16 is configured such that sliding a finger across the slider 16 can impart "momentum" to the slider 16 such that the displayed value might continue to increase (or decrease) even after the slide is completed, at which point such momentum will slowly peter out until the displayed value ceases increasing (or decreasing), although in at least some preferred implementations a slider 16 does not include such momentum functionality.

Just as increment and decrement buttons 14 of a user interface element can be characterized as facilitating micro level changes of a displayed value, a slider 16 can be characterized as facilitating macro level changes of a displayed value. In at least some preferred implementations, however, a user interface element 10 is configured such that the increment and decrement buttons 14 can be used in combination with the slider 16 to change the sensitivity of the slider (that is, to change the rate of change of the displayed value when a user slides his or her finger across it). For example, in one or more preferred implementations, a user can engage the increment button 14 while sliding his or her finger from left to right across the slider 16 to effect a more rapid increase of the displayed value than would occur if the user slid his or her finger across the slider 16 without engaging the increment button 14, as illustrated in FIGS. 6A-6D.

Although in the illustrated example a user engages the increment button while sliding his or her finger from left to right, it will be appreciated that a user could equally engage the decrement button while sliding his or her finger from right to left. Further, in at least some implementations the user interface element could be configured such that a user could engage the decrement button while sliding his or her finger from left to right (or from down to up) in order to increase the displayed value at a slower rate than would occur absent engagement of the decrement button, and similarly a user could engage the increment button while sliding his or her finger from right to left (or from up to down) in order to decrease the displayed value at a slower rate than would occur absent engagement of the decrement button. Alternatively, in at least some preferred implementations, engagement of the increment button might always increase the sensitivity of the slider 16, while engagement of the decrement button might always decrease the sensitivity of the slider 16.

As with the original sensitivity of the slider itself, in some preferred implementations, the change in the sensitivity of the slider when engaging one of the buttons 14 is selected, or calibrated, based on consideration of the type of the value and the likely changes that will need to be effected using the user interface element 10, e.g. based on likely values to be entered.

In at least some preferred implementations, the sensitivity of a slider is configured so as to allow a user to select a value relative to a minimum and maximum value, where sliding from one end of the slider to the other end of the slider would be sufficient to change the value from a minimum value all the way to a maximum value. In at least some implementations, a slider is configured to allow a user to select a value not relative to a currently displayed value, but instead absolutely, relative only to a minimum and maximum value.

Because the increment and decrement buttons 14 of the user interface element 10 can be characterized as facilitating micro level changes of a displayed value, and the slider 16 can be characterized as facilitating macro level changes of a displayed value, the user interface element 10 can be characterized as a macro/micro slider control.

Notably, in one or more preferred implementations, a macro/micro slider control user interface element might be used in combination with one or more other user interface elements, such as, for example, a drop down list or radio button.

Figure 7A:
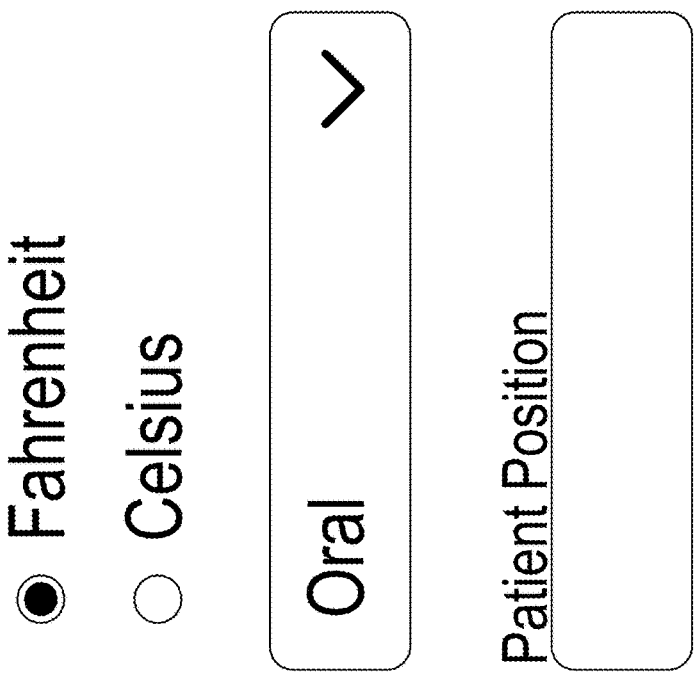
FIGS. 7A-7C illustrate an exemplary macro/micro slider control user interface element which is utilized in combination with several radio buttons as well as a drop down box and a text box.
Figure 7A:
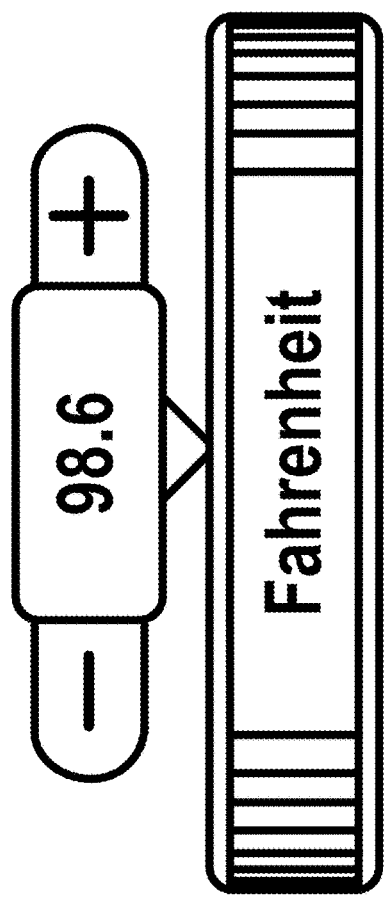
Figure 7B:
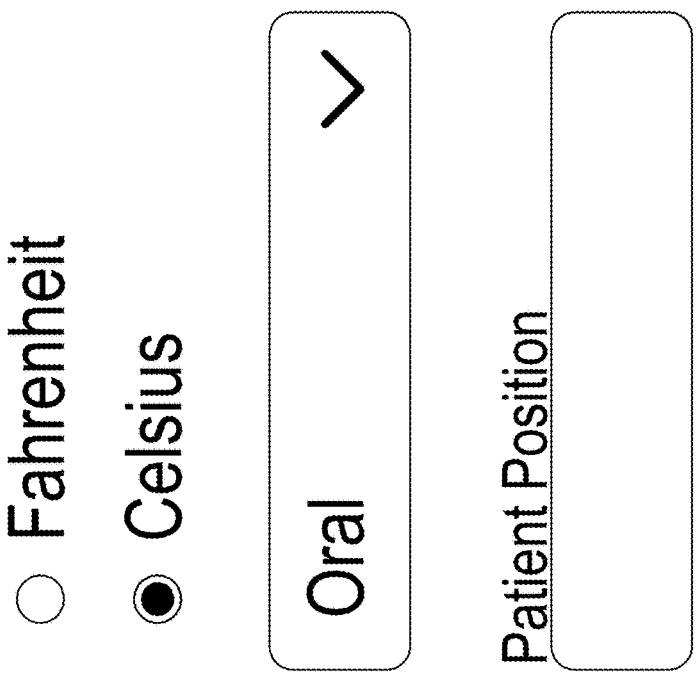
Figure 7B:
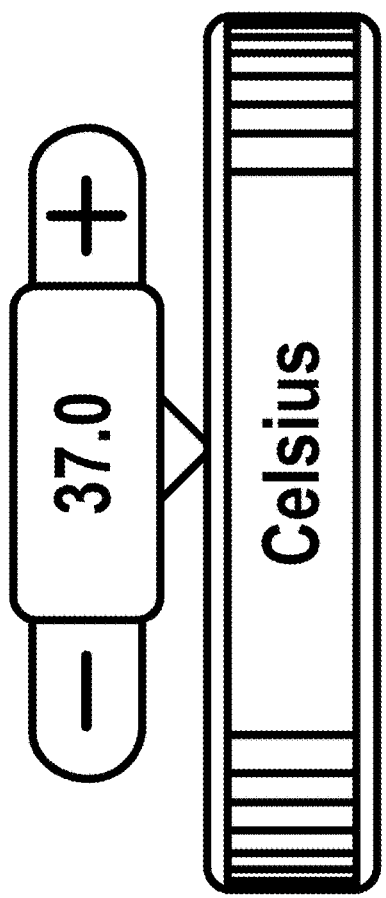
Figure 7C:
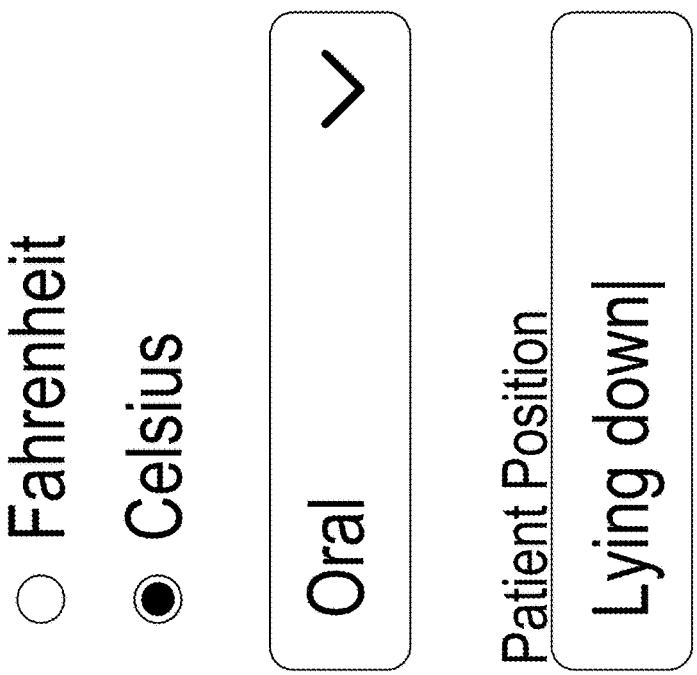
Figure 7C:
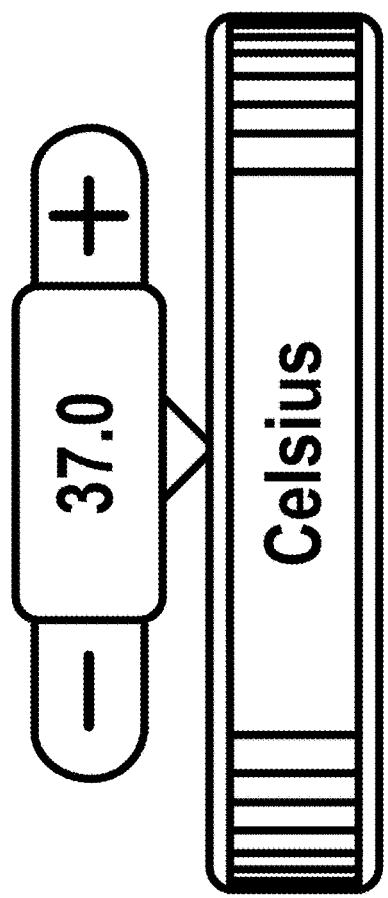

FIGS. 7A-7C illustrate an exemplary such macro/micro slider control user interface element which is utilized in combination with several radio buttons to select degrees Fahrenheit or degrees Celsius, as well as a drop down box which can be utilized to select how the temperature was measured (e.g., orally), and a text box which can be utilized to enter the patient's position when the temperature reading was taken (e.g., lying down). As illustrated via reference to FIGS. 7A-B, selection of degrees Celsius or Fahrenheit via the radio buttons preferably modifies the macro/micro slider control accordingly.

Figure 8:
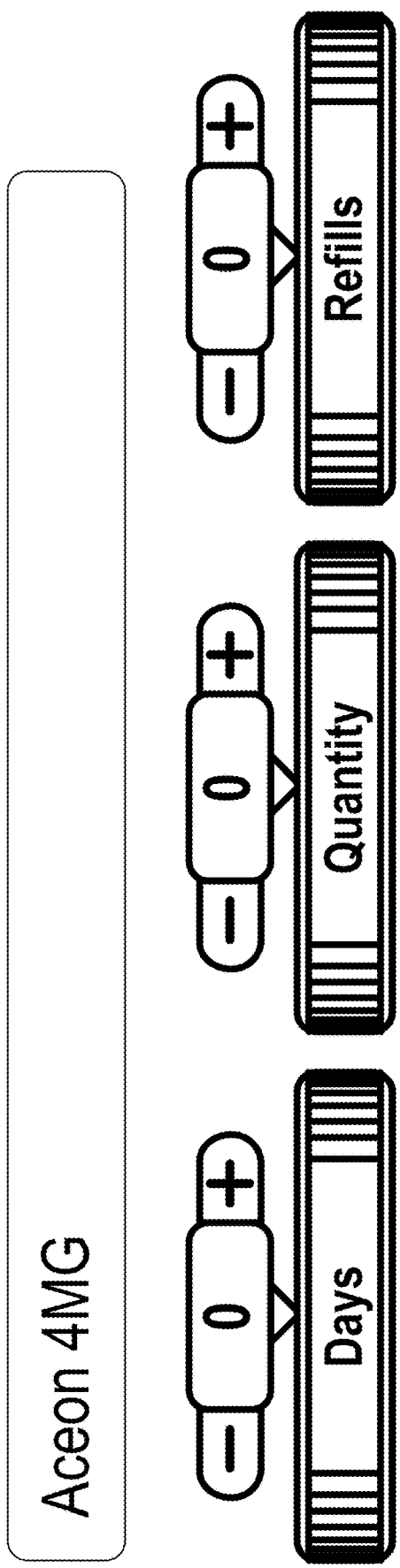
FIG. 8 illustrates a portion of an exemplary interface including three macro/micro slider controls which is configured to allow a user to input medication data.

In accordance with one or more preferred embodiments, macro/micro slider control user interface elements are used in combination with other user interface elements in a software application designed for use with a touchscreen. The software application is configured to allow a user to input patient data via the touchscreen using one or more macro/micro slider control user interface elements, as well as other user interface elements. Such patient data preferably includes vital reading data and medication data. For example, FIG. 8 illustrates a portion of an exemplary interface including three macro/micro slider controls which is configured to allow a user to input medication data.

Additional disclosure of aspects and features in accordance with one more preferred embodiments of the present invention is included in Exhibit 1 submitted herewith, which represents screenshots of an exemplary software application configured to allow a user to input patient data via a touchscreen using one or more macro/micro slider control user interface elements. The entire disclosure of this Exhibit is hereby incorporated herein by reference.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of receiving user input comprising:
   (a) displaying via a touchscreen display a user interface element comprising
      (i) a display area configured to display a value, wherein the display area is configured to allow a user to tap within the display area to bring up a virtual keyboard for editing the displayed value,
      (ii) an increment button configured to increment the displayed value,
      (iii) a decrement button configured to decrement the displayed value,
      (iv) a slider including a label displayed within the slider which indicates what data the value in the display area represents, the slider being configured to allow a user to increase or decrease the displayed value by sliding a finger across the slider;
   (b) receiving, via the touchscreen display, first input from a user corresponding to sliding a finger across the slider to a first end of the slider;

(c) electronically determining that the user input corresponds to desired user entry using the user interface element; and
(d) modifying the displayed value based on the received first input from the user;
(e) receiving, via the touchscreen display, second input from the user corresponding to again sliding a finger across the slider to the first end of the slider;
(f) electronically determining that the user input corresponds to desired user entry using the user interface element;
(g) further modifying the displayed value based on the received second input from the user;
(h) wherein the user interface element is configured such that engaging the increment button and sliding a finger across the slider in a first direction results in a lower rate of change than would otherwise occur if a finger was slid across the slider in the same manner at the same speed without engaging the increment button; and
(i) wherein the user interface element is configured such that engaging the increment button and sliding a finger across the slider in a second direction results in a greater rate of change than would otherwise occur if a finger was slid across the slider in the same manner at the same speed without engaging the increment button, the second direction being opposite the first direction.

2. The method of claim 1, wherein the slider is configured such that sliding a finger across the slider more rapidly results in a more rapid rate of change of the displayed value.

3. The method of claim 1, wherein the method further includes displaying the user interface element together with additional user interface elements.

4. The method of claim 3, wherein the additional user interface elements include one or more radio buttons.

5. The method of claim 3, wherein the additional user interface elements include one or more dropdown boxes.

6. The method of claim 3, wherein the additional user interface elements include one or more text boxes.

7. The method of claim 1, wherein the user interface element is configured such that engaging the increment button for a certain period of time causes repeated incrementing of the displayed value.

8. The method of claim 1, wherein the user interface element is configured such that engaging the decrement button for a certain period of time causes repeated decrementing of the displayed value.

9. A method of receiving user input comprising:
(a) displaying via a touchscreen display a user interface element comprising
  (i) a display area configured to display a value,
  (ii) an increment button configured to increment the displayed value,
  (iii) a decrement button configured to decrement the displayed value,
  (iv) a slider configured to allow a user to increase or decrease the displayed value by sliding a finger across the slider;
(b) receiving, via the touchscreen display, first input from a user corresponding to sliding a finger across the slider to a first end of the slider and further past the first end of the slider;
(c) electronically determining that the user input corresponds to desired user entry using the user interface element; and
(d) modifying the displayed value based on the received first input from the user, wherein the displayed value continues to be modified based on the user input even after the user's finger slides past the first end of the slider;
(e) receiving, via the touchscreen display, second input from the user corresponding to again sliding a finger across the slider to the first end of the slider;
(f) electronically determining that the user input corresponds to desired user entry using the user interface element; and
(g) further modifying the displayed value based on the received second input from the user;
(h) wherein the user interface element is configured such that engaging the increment button and sliding a finger across the slider in a first direction results in a lower rate of change than would otherwise occur if a finger was slid across the slider in the same manner at the same speed without engaging the increment button; and
(i) wherein the user interface element is configured such that engaging the increment button and sliding a finger across the slider in a second direction results in a greater rate of change than would otherwise occur if a finger was slid across the slider in the same manner at the same speed without engaging the increment button, the second direction being opposite the first direction.

10. The method of claim 9, wherein the slider is configured such that sliding a finger across the slider more rapidly results in a more rapid rate of change of the displayed value.

11. The method of claim 9, wherein the method further includes displaying the user interface element together with additional user interface elements.

12. The method of claim 11, wherein the additional user interface elements include one or more radio buttons.

13. The method of claim 11, wherein the additional user interface elements include one or more dropdown boxes.

14. The method of claim 11, wherein the additional user interface elements include one or more text boxes.

15. The method of claim 9, wherein the slider includes a label.

16. The method of claim 9, wherein the user interface element is configured such that engaging the increment button for a certain period of time causes repeated incrementing of the displayed value.

17. The method of claim 9, wherein the user interface element is configured such that engaging the decrement button for a certain period of time causes repeated decrementing of the displayed value.

18. A method of receiving user input comprising:
(a) displaying via a touchscreen display a user interface element comprising
  (i) a display area configured to display a value,
  (ii) an increment button configured to increment the displayed value,
  (iii) a decrement button configured to decrement the displayed value,
  (iv) a slider configured to allow a user to increase or decrease the displayed value by sliding a finger across the slider;
(b) receiving, via the touchscreen display, first input from a user corresponding to sliding a finger across the slider to a first end of the slider;
(c) electronically determining that the user input corresponds to desired user entry using the user interface element; and
(d) modifying the displayed value based on the received first input from the user, wherein the user's sliding of a finger across the slider imparts momentum on the slider such that the displayed value continues to slowly increase or decrease even after the first input is completed, the momentum being reduced until the displayed value ceases increasing or decreasing;

(e) receiving, via the touchscreen display, second input from the user corresponding to again sliding a finger across the slider to the first end of the slider;

(f) electronically determining that the user input corresponds to desired user entry using the user interface element; and (g) further modifying the displayed value based on the received second input from the user;

(h) wherein the user interface element is configured such that engaging the increment button and sliding a finger across the slider in a first direction results in a lower rate of change than would otherwise occur if a finger was slid across the slider in the same manner at the same speed without engaging the increment button; and (i) wherein the user interface element is configured such that engaging the increment button and sliding a finger across the slider in a second direction results in a greater rate of change than would otherwise occur if a finger was slid across the slider in the same manner at the same speed without engaging the increment button, the second direction being opposite the first direction.

19. The method of claim 18, wherein the slider includes a label.

\* \* \* \* \*